United States Patent [19]

Barie, Jr. et al.

[11] 3,939,109

[45] Feb. 17, 1976

[54] POLYAMIC-ACIDS PREPARED FROM 3,3,4,4-BENZHYDROL TETRACARBOXYLIC DIANHYDRIDE

[75] Inventors: Walter P. Barie, Jr., Shaler Township; Anatoli Onopchenko, Monroeville; Johann G. D. Schulz, Pittsburgh, all of Pa.

[73] Assignee: Gulf Research & Development Company, Pittsburgh, Pa.

[22] Filed: Dec. 19, 1974

[21] Appl. No.: 534,230

[52] U.S. Cl....... 260/29.1 R; 260/30.2; 260/30.8 R; 260/30.8 DS; 260/32.6 N; 260/37 N; 260/47 CP; 260/63 R; 260/78 TF; 428/458; 428/474
[51] Int. Cl.².......................................... C08G 73/10
[58] Field of Search. 260/78 TF, 47 CP, 65, 29.1 R, 260/30.8 R, 30.8 DS, 32.6 N, 63 R; 117/161 P, 128.4; 161/227; 428/458, 474

[56] References Cited
UNITED STATES PATENTS

| | | | |
|---|---|---|---|
| 3,609,123 | 9/1971 | Rabilloud et al. | 260/47 |
| 3,793,291 | 2/1974 | Giuliani et al. | 260/47 |

*Primary Examiner*—Lester L. Lee

[57] ABSTRACT

A novel polyamic acid intermediate composition in a polar, aprotic solvent and the corresponding fully condensed polyimide are prepared from 3,3',4,4'-benzhydrol tetracarboxylic dianhydride and a diamine having at least two carbon atoms such as bis(4-aminophenyl)ether.

7 Claims, No Drawings

POLYAMIC-ACIDS PREPARED FROM 3,3,4,4-BENZHYDROL TETRACARBOXYLIC DIANHYDRIDE

This invention relates to the polyamic acid intermediates and to the strong, flexible, thermally stable polyimides prepared from 3,3',4,4'-benzhydrol tetracarboxylic dianhydride and a diamine having at least two carbon atoms.

The linear polyimides are recognized as possessing excellent resistance to high temperatures as well as other noteworthy properties including resistance to oils and many organic chemicals, good electrical properties and radiation resistance. The linear polyimides are generally utilized as coatings or as unsupported films or filaments. These polyimide materials are generally prepared from an aromatic dianhydride and an aromatic diamine in two distinct stages. In the first-stage the dianhydride and the diamine link together forming an alternating chain polyamic acid. In the second stage the polyamic acid condenses to the desired polyimide.

In a typical procedure for preparing polyimides an aromatic dianhydride and an aromatic diamine are dissolved in a suitable solvent for the condensation reaction to the polyamic acid. A highly polar solvent, such as dimethyl acetamide is a preferred solvent for the formation of long chain polyamic acid polymers of suitable properties. Since the aromatic dianhydrides are difficultly soluble solids, the resin solution as conventionally formulated for reaction to the polyamic acid can only contain from about 10 to 20 percent solids. The resulting polyamic acid in solution is then conveniently coated onto the desired substrate or formed into a film or a fiber, as desired, for solvent removal and condensation to the polyimide.

The compound 3,3',4,4'-benzhydrol tetracarboxylic dianhydride is a diaryl dianhydride very similar in structure to 3,3',4,4'-benzophenone tetracarboxylic dianhydride. However, due to the reactive aliphatic hydroxyl group in the former compound, it possesses certain uniquely different reaction characteristics. Thus, U.S. Pat. No. 3,293,267 describes and illustrates the active self-condensation of 3,3',4,4'-benzhydrol tetracarboxylic dianhydride by anhydride-hydroxyl reaction to produce a useful homopolymer, having a free carboxyl group for each anhydride-hydroxyl reaction. This self-esterification reaction of the 3,3',4,4'-benzhydrol tetracarboxylic dianhydride readily occurs when it is dissolved in a solvent but does not occur in the solid, undissolved state.

In view of the facile anhydride-hydroxyl reactivity of 3,3',4,4'-benzhydrol tetracarboxylic dianhydride and the fact that a solution is required for the preparation of polyamic acids, it was believed that this particular diaryl dianhydride could not be used as a copolymerization reactant in the preparation of polyimides. The diamine-dianhydride reaction to the alternating chain polyimide is an invariant 1:1 reaction of the two monomers. It was believed to be self-evident that the 3,3',4,4'-benzhydrol tetracarboxylic dianhydride in the solution of reactants would readily self-esterify and would thereby substantially interfere with the desired polyamic acid copolymerization reaction both by removing a substantial amount of this dianhydride as an available reactant and by introducing chain-stopping carboxyl groups into the system.

Notwithstanding this affinity of the 3,3',4,4'-benzhydrol tetracarboxylic dianhydride for the self-esterification reaction, we have unexpectedly discovered that a solution of this dianhydride and a diamine will quantitatively copolymerize to the polyamic acid with no detectable ester group in the resulting polyimide. Surprisingly, the hydroxyl groups are substantially unreacted in the final polyimide. We have also unexpectedly discovered that the polyamic acid solution can be made with as high as about 35 weight percent solids content when 3,3',4,4'-benzhydrol tetracarboxylic dianhydride is used as the diaryl dianhydride. This higher concentration of the polyamic acid solution is particularly advantageous in reducing shipping and storage costs.

In preparing the polyimide of our invention a suitable diamine and the 3,3',4,4'-benzhydrol tetracarboxylic dianhydride are dissolved in a polar, aprotic solvent in stoichiometric amounts for the 1:1 reaction. Preferred solvents include dimethyl formamide, dimethylacetamide, N-methylpyrrolidone, dimethylsulfoxide, and the like. The first-stage reaction to the polyamic acid is carried out at a temperature of about 0° C. up to about 100° C. but preferably from about room temperature (20° C.) up to no higher than about 50° C., most preferably no higher than about 40° C., to avoid the possibility of the polyamic acid reacting further to the polyimide in this first-stage. In the second stage the polyamic acid is preferably freed of solvent and is further condensed to the corresponding polyimide over a period of time at incrementally increasing temperatures of between about 50° and about 350° C., preferably ending at a temperature between about 200° and about 300° C.

The diamines which are useful herein for preparing the polyamic acid and the polyimide can be represented by the formula $H_2N-R-NH_2$, wherein R is a divalent organic radical containing at least two carbon atoms with each nitrogen atom chemically bonded to different carbon atoms and selected from the groups: aromatic, aliphatic, cycloaliphatic, combined aromatic and aliphatic, heterocyclic, bridged organic radicals wherein the bridge is oxygen, nitrogen, sulfur, silicon or phosphorus, and substituted groups thereof. Suitable diamines for producing the polyamic acid and the polyimide of this invention include those disclosed in U.S. Pat. Nos. 3,179,633; 3,179,634 and 3,190,856, the disclosures of which with respect to diamines are incorporated herein by reference.

The preferred diamines are aromatic diamines including monocyclic diamines; such as p-phenylene diamine; m-phenylene diamine; 2,4-toluenediamine; 2,5-toluenediamine; 2,5-diaminochlorobenzene; 2,4-diaminoanisole and the like; bicyclic diamines, such as 1,4-diaminonaphthalene and the like; and bis-cyclo diamines such as those having the formula

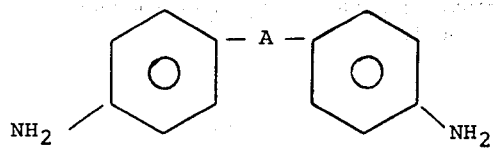

wherein A is a group selected from $-O-$, $-CO-$, $-C(R')(R'')-$, $-S-$, $-SO-$ and $-SO_2-$, where R' and R'' are independently hydrogen or a lower alkyl radical having from one to about four carbon atoms. Examples include bis(4-aminophenyl)ether; diaminodiphenyl sulfone; diaminophenyl methane; 4,4'- propylidene dianiline, thiodianiline and the like. Mixtures of the diamines can also be used.

Polar, aprotic solvents which are useful for dissolving the 3,3',4,4'-benzhydrol tetracarboxylic dianhydride and diamine reactants and the resulting polyamic acid include the sulfoxides, the sulfones, the di-N-substituted carboxylic acid amides, the N-substituted pyrrolidones, and the like. The sulfoxides are defined by the formula $R_1(R_2)S{:}O$ in which $R_1$ and $R_2$ are independently selected from lower alkyl, phenyl and benzyl and chlorine substituted derivatives thereof. Dimethyl sulfoxide is the preferred sulfoxide. Also useful are diethyl sulfoxide, di-n-propyl sulfoxide, di-n-butyl sulfoxide, di-2-chloroethyl sulfoxide, diphenyl sulfoxide, methyl phenyl sulfoxide, benzyl phenyl sulfoxide, dibenzyl sulfoxide, and the like. The sulfones are defined by the formula $R_3(R_4)SO_2$ in which $R_3$ and $R_4$ are independently selected from lower alkyl and can be joined together to form a cyclic compound having from three to eight members in the ring. Sulfolane also known as tetramethylene sulfone is the preferred sulfone. Also useful are dimethyl sulfone, diethyl sulfone, trimethylene sulfone, pentamethylene sulfone, hexamethylene sulfone, and the like.

The di-N-substituted carboxylic acid amides are defined by the formula $R_5CONR_6(R_7)$ in which $R_5$ is hydrogen or lower alkyl and $R_6$ and $R_7$ are independently lower alkyl. Preferred di-N-substituted carboxylic acid amides are dimethyl formamide and dimethyl acetamide. Also useful are diethyl formamide, diethyl acetamide, di-n-propyl acetamide, di-t-butyl acetamide, dimethyl butyramide, dimethyl propionamide, and the like. The useful N-substituted pyrrolidones include the N-lower alkyl alpha and beta pyrrolidones. Preferred are N-methyl pyrrolidone and N-ethyl pyrrolidone. Other polar, aprotic solvents are useful herein. The term lower alkyl includes alkyl groups having from one to about four carbon atoms. Suitable mixtures of two or more polar, aprotic solvents can also be used. Particular care is exercised in selecting a solvent which possesses both the desired solubilizing capacity as well as a suitable volatility for solvent removal.

The desired reaction of 3,3',4,4'-benzhydrol tetracarboxylic dianhydride with the diamine in the first stage produces a solution of a polyamic acid having the general formula

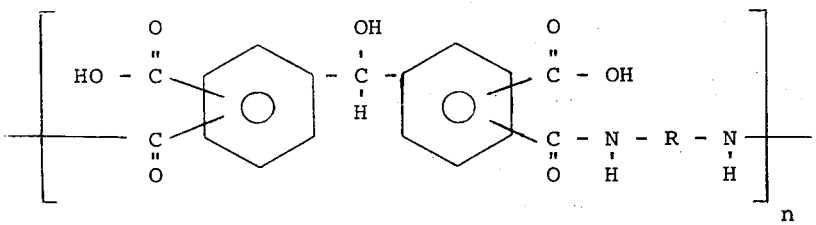

where the carbonyl groups are independently in the 3-, 4- and 3'-, 4'- positions respectively, wherein $n$ is greater than about 10 up to about 1,000, preferably between about 50 and about 200, and R is as defined above. The polyamic acid in solution is formed with a polyamic acid content of between about 5 and about 35 weight percent and preferably between about 15 and about 30 weight percent. This polyamic acid is then further condensed, following the removal of the solvent, to produce a polyimide having the general formula

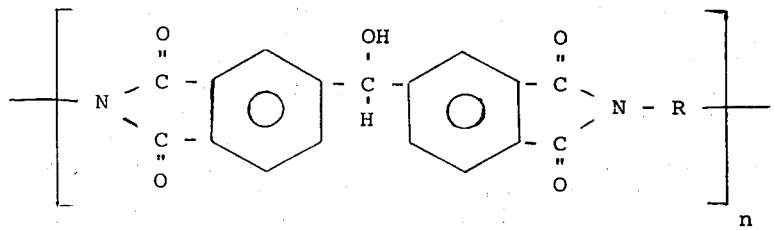

wherein $n$ and R are as defined above.

The 3,3',4,4'-benzhydrol tetracarboxylic dianhydride and the diamine are preferably used in substantially equal molar amounts for the equimolar copolymerization reaction to the alternating chain polymer. A substantial excess, that is greater than about 5 percent, of either monomer tends to substantially restrict the degree of polymerization with a consequent substantial diminishment in the desirable properties of the polyimide.

The solution of the polyamic acid is preferably prepared in high solids content such as about 25 to about 35 weight percent solids if it is to be shipped or stored in order to reduce overall volume and concomitant costs. For coating applications, casting of films, ejecting as filaments, wetting of reinforcing cloth, and like uses, the viscosity of the polyamic acid solution can be adjusted appropriate to the use by the addition of additional solvent. This solvent can most suitably be a further quantity of the same solvent already present or it can be another suitable solvent for the polyamic acid. If desired, suitable fillers, pigments, plasticizing agents, and the like can be added to this polyamic acid solution.

In preparing the solution of the reacting momomers it is preferred that the diamine be introduced into the polar, aprotic solvent and solubilized before the 3,3',4, 4'-benzhydrol tetracarboxylic dianhydride is added in order to forestall the self-esterification of this dianhydride. As an alternative but less preferred procedure the two components can be solubilized at the same time. The solvent can be substantially removed from the polyamic acid at a partial vacuum at a temperature at which no significant condensation of the polyamic acid takes place. More preferably the solvent is removed as well as the water resulting from the condensation reaction to the polyimide at a relatively low reaction temperature with the temperature being progressively increased until all solvent and all water has been removed and all of the polyamic acid has been converted to the desired polyimide.

The following examples are set out to illustrate the invention and to provide a better understanding of its details and advantages.

EXAMPLE 1

A solution of 10.0 g. (0.05 mol) of 4,4′-diaminophenylether in 115 cc. of water-free dimethylacetamide was prepared in a 250 cc. flask fitted with a stirrer, powder addition apparatus and a glass tube for sample removal for measurement of viscosity. The flask was closed to the atmosphere to exclude moisture. Over a 2-hour period 16.4g.(0.0508 mol) of powdered 3,3′,4,4′-benzhydrol tetracarboxylic dianhydride was added with stirring. There was an exothermic reaction but the temperature was maintained below 40° C. by the controlled addition of the dianhydride to avoid conversion of polyamic acid to polyimide. The viscosity of the solution increased to Gardner G at the end of the reaction. The solution contained about 20 weight percent polyamic acid.

A film of this solution was cast on sheet Mylar (polyethylene terephthalate) using a Bird applicator set at 10 mils (0.25mm.). The film was dried one-half hour at 150° C. in a circulating air oven. The resulting self-supporting film was stripped from the Mylar and was placed on a metal plate with metal strips holding the film in place. The final cure was completed step-wise from 200° to 300° C. by increasing the temperature over a period of about 1 hour with 300° C. maintained for one-half hour. The resulting film of about 1 mil (0.025 mm.) thickness was clear, yellow and transparent. The F.E.T. (folding endurance test), ASTM D-2176, on a series of strips cut from the film resulted in an average of about 15,000 folds for strips taken lengthwise to the direction of casting and an average of about 1,600 folds for samples taken transversely to the direction of casting.

EXAMPLE 2

Example 1 was repeated except that a total of 16.6 g. (0.514 mol) of the 3,3′,4,4′-benzhydrol tetracarboxylic dianhydride was used. The Gardner viscosity of the polyamic acid solution increased to a K value. Films were prepared on steel as well as on Mylar as in Example 1. Strips prepared from these films were tested in the folding test and demonstrated F.E.T. values having an average of 25,800 folds for the lengthwise strips and 20,000 for the transverse strips.

EXAMPLE 3

The same general procedure was used as described in Example 1. A 10.0 g. charge of 4,4′-diaminophenylether was introduced into 65.3 cc. of dimethylacetamide. Powdered 3,3′,4,4′-benzhydrol tetracarboxylic dianhydride was added incrementally over a five-hour period, with complete solution obtained between increments, until 17.1 g. (0.053 mol) had been added. The temperature varied between 28°-38° C. over this 5-hour period. The final solution containing about 30 percent polyamic acid exhibited a Gardner viscosity of z-3. A film was cast and cured as before and was tested to determine the F.E.T. values. The tested strips resulted in an average of 14,700 folds for the lengthwise strips and 11,600 folds for the transverse strips.

Infra-red absorption studies of polyimide films cast directly on silver chloride wafers confirmed the preparation of the polyimide structure with no absorption band in the ester or anhydride range. The polyimide can be cured as a coating on a metal surface such as on copper or aluminum conductors, cured to adhere metal objects such as titanium together, cured as a filament and the like. The polyamic acid solution can also be used to wet reinforcing cloth lamina, such as glass cloth, and thickened with solvent removal to a handleable pre-preg which will flow under heat and pressure using stacked layers to form a reinforced polyimide laminate. The novel polyimide of this invention can also be utilized in other applications for which polyimides are particularly adapted. In the above examples the Gardner viscosity is also known as the Gardner-Holdt viscosity.

It is to be understood that the above disclosure is by way of specific example and that numerous modifications and variations are available to those of ordinary skill in the art without departing from the true spirit and scope of the invention.

We claim:

1. A polyamic acid having the general formula

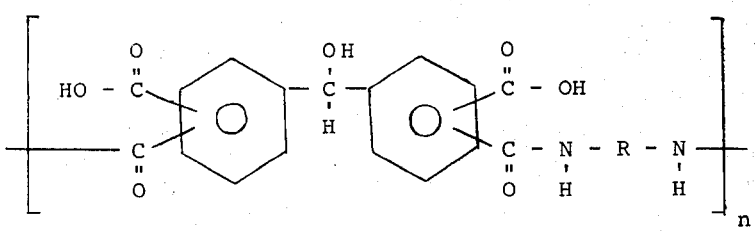

where the carbonyl groups are independently in the 3-, 4- and 3′-, 4′- positions respectively, wherein $n$ is greater than about 10 up to about 1000 and R is a divalent organic radical having at least two carbon atoms with each nitrogen atom chemically bonded to different carbon atoms of said R radical.

2. A solution containing from about 5 to about 35 weight percent of said polyamic acid of claim 1 and the remainder being a polar, aprotic solvent.

3. A solution containing from about 15 to about 30 weight percent of the polyamic acid of claim 1 and the remainder being a polar, aprotic solvent.

4. A polyamic acid in accordance with claim 1 in which n is between about 50 and about 200.

5. A polyamic acid in accordance with claim 1 in which R is the divalent radical

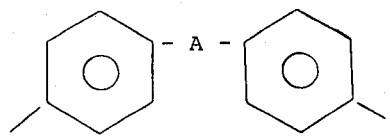

wherein A is a group selected from —O—, —CO—, —C(R′) (R″)—, —S—, —SO— and —SO$_2$—, where R' and R'' are independently hydrogen or a lower alkyl radical having from one to about four carbon atoms.

6. A method of preparing the polyamic acid of claim 1 which comprises reacting 3,3',4,4'-benzhydrol tetracarboxylic dianhydride with a diamine at a temperature between about 0° and about 100° C.

7. A method in accordance with claim 6 in which said reaction is carried out at a temperature between about 20° and about 50° C.

* * * * *

UNITED STATES PATENT AND TRADEMARK OFFICE
CERTIFICATE OF CORRECTION

PATENT NO. : 3,939,109

DATED : February 17, 1976

INVENTOR(S) : Walter P. Barie, Jr., Anatoli Onopchenko and Johann G. D. Schulz

It is certified that error appears in the above-identified patent and that said Letters Patent are hereby corrected as shown below:

[54] Title and Column 1, line 2, "3,3,4,4" (each occurrence) should read --3,3',4,4'--.

Column 4, line 44, "momomers" should read --monomers--.

Column 5, after last line, insert --temperature varied between 28-38° C. over this five-hour period.
The final solution containing about 30 percent polyamic acid exhibited a Gardner viscosity of Z-3. A film was cast and cured as before and was tested to determine the F.E.T. values. The tested strips resulted in an average of 14,700 folds for the lengthwise strips and 11,600 folds for the transverse strips.
    Infra-red absorption studies of polyimide films cast directly on silver chloride wafers confirmed the prepa---.

Column 6, lines 23 to 31, delete "temperature varied between 28-38° C. over this five-hour period.
The final solution containing about 30 percent polyamic acid exhibited a Gardner viscosity of Z-3. A film was cast and cured as before and was tested to determine the F.E.T. values. The tested strips resulted in an average of 14,700 folds for the lengthwise strips and 11,600 folds for the transverse strips.
    Infra-red absorption studies of polyimide films cast directly on silver chloride wafers confirmed the prepa---.

Signed and Sealed this twenty-fifth Day of May 1976

[SEAL]

Attest:

RUTH C. MASON
Attesting Officer

C. MARSHALL DANN
Commissioner of Patents and Trademarks